United States Patent
LaMacchia et al.

[11] Patent Number: 6,108,419
[45] Date of Patent: Aug. 22, 2000

[54] DIFFERENTIAL FAULT ANALYSIS HARDENING APPARATUS AND EVALUATION METHOD

[75] Inventors: Michael Philip LaMacchia; Bobby Glen Barker, both of Gilbert; Chuckwudi Perry, Scottsdale, all of Ariz.

[73] Assignee: Motorola, Inc., Schaumburg, Ill.

[21] Appl. No.: 09/013,550

[22] Filed: Jan. 27, 1998

[51] Int. Cl.$^7$ .................................................... H04K 1/00
[52] U.S. Cl. ................................... 380/2; 380/1; 380/52; 380/59; 713/200; 713/194
[58] Field of Search ............................... 380/52, 1, 2, 59, 380/280, 201, 210; 713/200, 194; 705/57

[56] References Cited

PUBLICATIONS

Bihan and Shamir, "Research Announcement: A New Cryptanalytic Attack on DES," Bellcore, Oct. 1996.

An article entitled "Differential Fault Analysis: Identifying the Structue of Unknown Ciphers Sealred in Tamper–Proof Devices" by E. Biham and A. Shamir of Israel, Nov. 10, 1996. pp. 1–3.

An article entitled "Improved Differential Fault Analysis" by R. J. Anderson and M. G. Kuhn, pp. 1–6.

An article entitled "Research Announcement: A New Cryptanalytic Attack on DES" by E. Biham and A. Shamir of Israel, Bellcore, Sep., 1996.

An article entitled "On the Importance of Checking Computations", © 1997 Bellcore, pp. 1–4.

An article entitled "The Next Stage of Differential Fault Analysis: How to Break Completely Unkown Cryptosystems", by E. Biham and A. Shamir of Israel, Oct. 30, 1996, pp. 1–2.

*Primary Examiner*—Tod R. Swann
*Assistant Examiner*—Paul E. Callahan
*Attorney, Agent, or Firm*—Gregory J. Gorrie

[57] ABSTRACT

A method of evaluating a cryptosystem to determine whether the cryptosystem can withstand a fault analysis attack, the method includes the steps of providing a cryptosystem having an encrypting process to encrypt a plaintext into a ciphertext, introducing a fault into the encrypting process to generate a ciphertext with faults, and comparing the ciphertext with the ciphertext with faults in an attempt to recover a key of the cryptosystem.

2 Claims, 5 Drawing Sheets

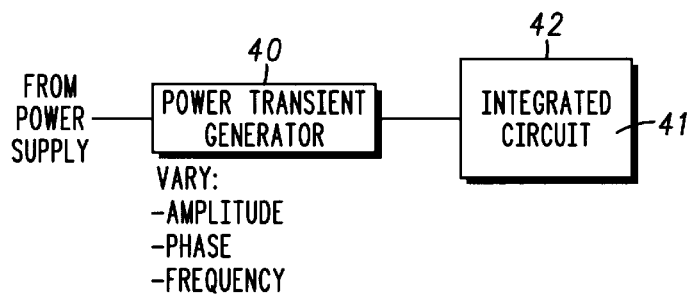
FIG. 3
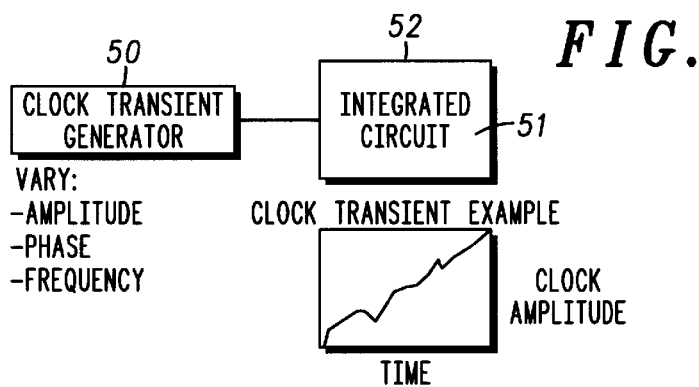
FIG. 4
FIG. 5
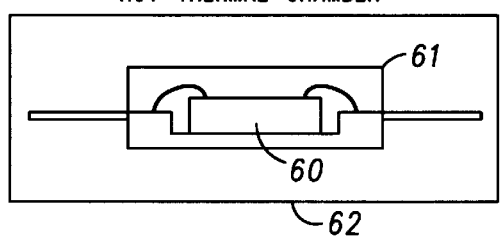 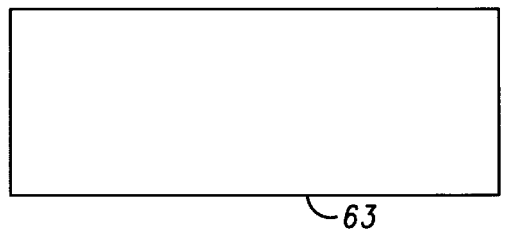
FIG. 6
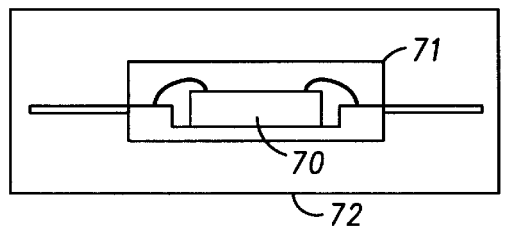 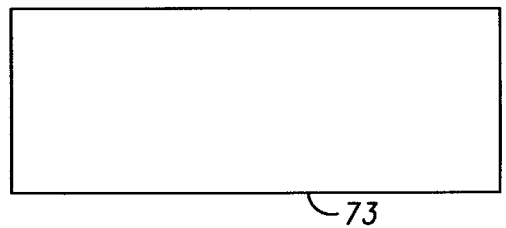

DIFFERENTIAL FAULT ANALYSIS HARDENING APPARATUS AND EVALUATION METHOD

FIELD OF THE INVENTION

This invention relates generally to the field of cryptography and, more particularly, to a fault analysis hardening apparatus and evaluation method for a cryptosystem.

BACKGROUND OF THE INVENTION

Differential Fault Analysis (DFA) is an attack on a cryptosystem in the form of directed energy such as heavy ion bombardment, RF energy, temperature shock, barometric shock, UV light, and laser energy. With a particular source of directed energy, an attack may seek to cause a single event fault (SEF). Just one SEF may yield a successful attack. However, known security systems have not focused on immunity to SEFs due to the relative novelty of fault based attacks of cryptanalytic intent.

Recent investigations into security mechanisms for cryptosystems have yielded unexpected findings regarding the nature of cryptographic systems as a whole. In particular, it has been discovered that one-bit errors may result from radiation or other environmental stresses. As a result, it has been found that a one-bit error or DFA can successfully attack the RSA Public Key Algorithm and symmetric ciphers, namely the Data Encryption Standard (DES).

Due to the lack of an adequate security mechanism for immunizing cryptosystems from DFA, one-bit attacks or SEFs, what is needed is a fault analysis hardening apparatus for a cryptosystem and a method of evaluating a cryptosystem to determine whether the cryptosystem can withstand a fault analysis attack, particularly a SEF or DFA.

BRIEF DESCRIPTION OF THE DRAWINGS

The specific objects and advantages of the instant invention will become readily apparent to those skilled in the art from the following detailed description thereof taken in conjunction with the drawings in which:

FIG. 3 illustrates a power transient generator coupled to an integrated circuit of a cryptosystem to introduce a fault into the cryptosystem;

FIG. 4 illustrates a clock transient generator coupled to an integrated circuit of a cryptosystem to introduce a fault into the cryptosystem;

FIG. 5 illustrates an integrated circuit of a cryptosystem being transferred from a hot thermal chamber to a cold thermal chamber to introduce a fault into the cryptosystem;

FIG. 6 illustrates an integrated circuit of a cryptosystem being transferred from a high-pressure chamber to a low-pressure chamber to introduce a fault into the cryptosystem;

DETAILED DESCRIPTION OF THE DRAWINGS

The present invention provides, among other things, a method for evaluating cryptographic hardware to determine whether the cryptographic hardware can be exploited through a fault analysis attack. If the cryptographic hardware can be exploited, the present invention further includes the provision of improving portions of the cryptographic hardware vulnerable or otherwise susceptible to successful fault analysis to enable the cryptographic hardware to resist exploitation.

Figure 1:
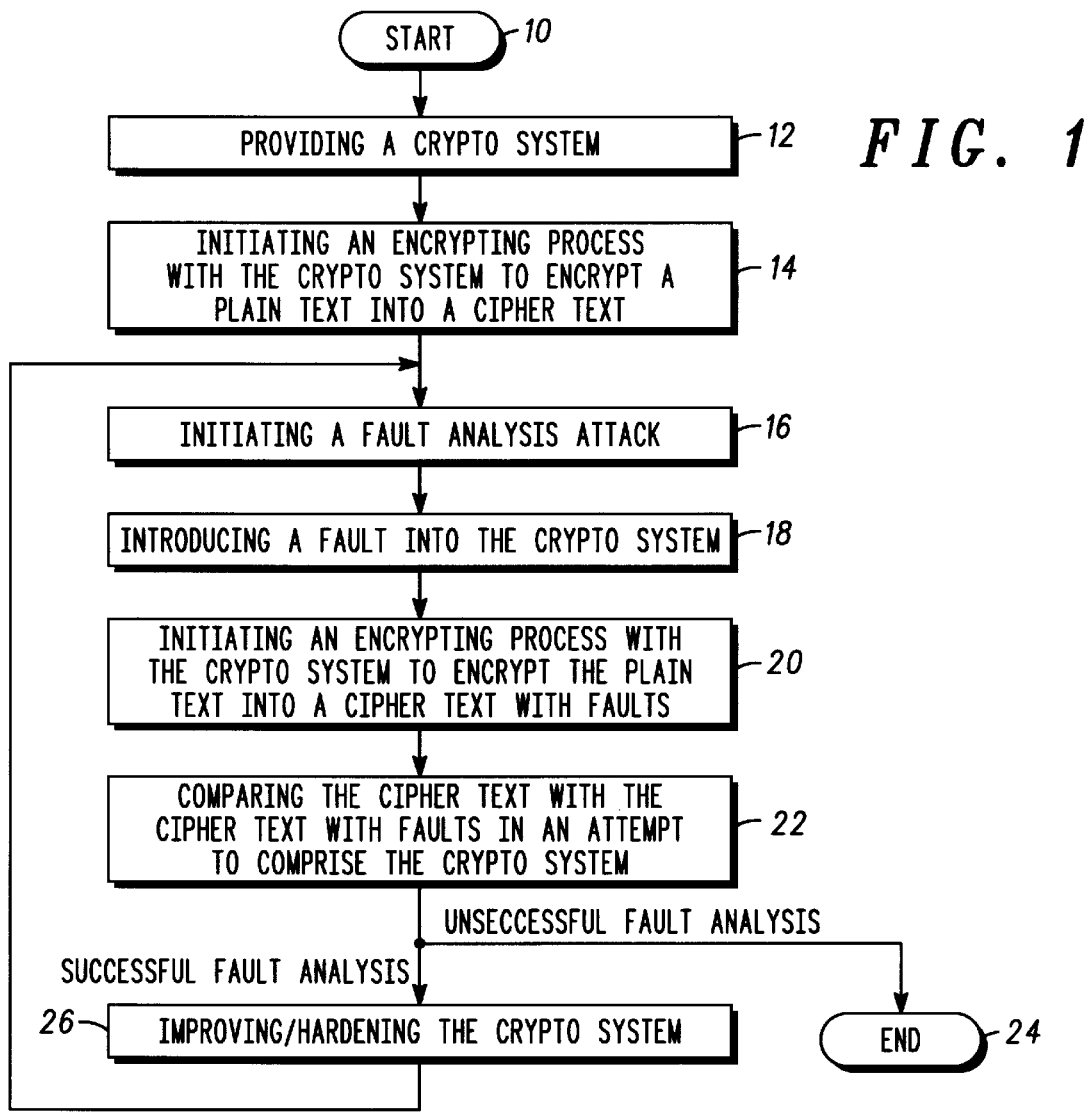
FIG. 1 illustrates a block diagram of a method of evaluating a cryptosystem to determine whether the cryptosystem can withstand a fault analysis attack, and of improving the cryptosystem to enable the cryptosystem to resist a fault analysis attack, in accordance with a preferred embodiment of the present invention.

Regarding a preferred embodiment of the present invention, attention is directed to FIG. 1 illustrating a block diagram of a method of evaluating a cryptosystem to determine whether the cryptosystem can withstand a fault analysis attack, and of improving the cryptosystem to enable the cryptosystem to resist a fault analysis attack, in accordance with a preferred embodiment of the present invention. The present method starts at task 10 with providing 12 a cryptosystem and initiating 14 an encrypting process with the cryptosystem to encrypt a plaintext into a ciphertext. Upon successful completion of task 14, the present method further includes the steps of initiating 16 a fault analysis by introducing 18 a fault into the cryptosystem, initiating 20 an encrypting process with the cryptosystem to encrypt the plaintext into a ciphertext with faults and comparing 22 the ciphertext with the ciphertext with faults in an attempt compromise the cryptosystem.

The foregoing method steps set forth in tasks 14–22 represent an attack commonly referred to as Differential Fault Analysis (DFA). Through the comparison of the ciphertext with the ciphertext with faults in task 22, a key of the cryptosystem for symmetric ciphers may be recovered, or a factoring modulus of the cryptosystem for a given asymmetric cipher may be recovered, both of which operate to compromise the cryptosystem.

Figure 2:
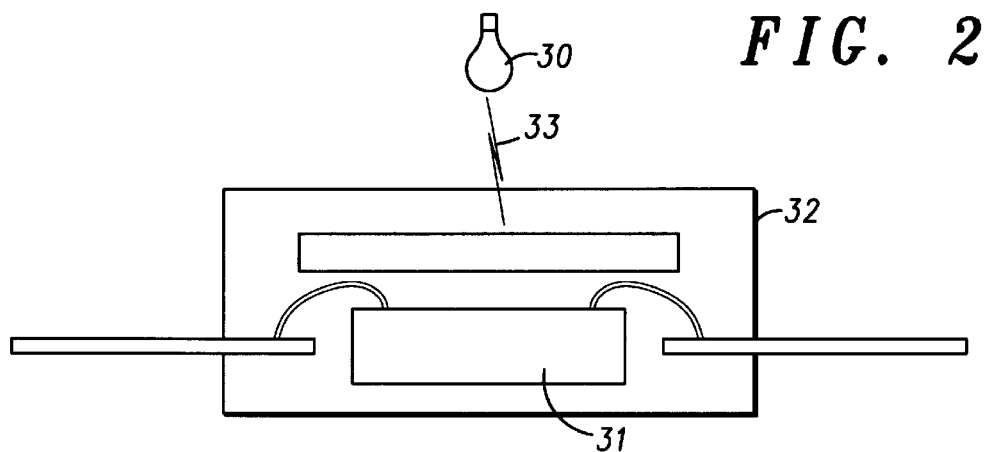
FIG. 2 illustrates a light source bombarding an integrated circuit of a cryptosystem with light to introduce a fault into the cryptosystem.
Figure 7:
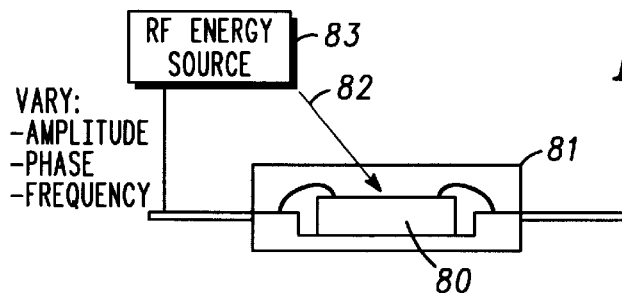
FIG. 7 illustrates an integrated circuit of a cryptosystem being bombarded with radio frequency energy supplied from a radio frequency source to introduce a fault into the cryptosystem.
Figure 8:
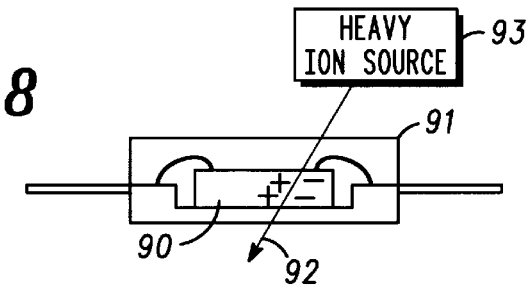
FIG. 8 illustrates an integrated circuit of a cryptosystem being bombarded with ions from a heavy ion source to introduce a fault into the cryptosystem.
Figure 9:
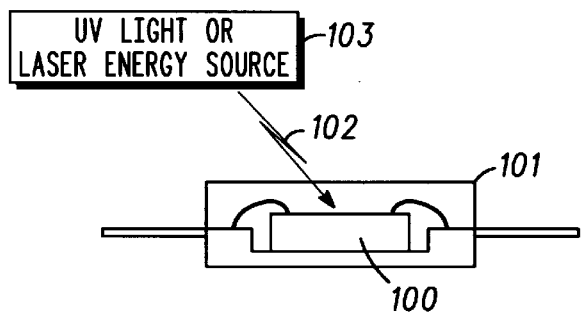
FIG. 9 illustrates an integrated circuit of a cryptosystem being bombarded with light from a light source to introduce a fault into the cryptosystem.

There are many methods of introducing a fault into a cryptosystem as set forth in task 18. Furthermore, the number of faults required may vary depending upon the cryptosystem and the placement of the induced fault into the cryptosystem. However, with some cryptosystems, a single fault can compromise the cryptosystem. Regarding specific examples of how a fault may be introduced into a cryptosystem, FIG. 2 illustrates a light source 30 bombarding an integrated circuit 31 of a cryptosystem 32 with light 33 to introduce a fault into cryptosystem 32; FIG. 3 illustrates a power transient generator 40 coupled to an integrated circuit 41 of a cryptosystem 42 to introduce a fault into cryptosystem 42; FIG. 4 illustrates a clock transient generator 50 coupled to an integrated circuit 51 of a cryptosystem 52 to introduce a fault into cryptosystem 52; FIG. 5 illustrates an integrated circuit 60 of a cryptosystem 61 being transferred from a hot thermal chamber 62 to a cold thermal chamber 63 to introduce a fault into cryptosystem 61; FIG. 6 illustrates an integrated circuit 70 of a cryptosystem 71 being transferred from a high-pressure chamber 72 to a low-pressure chamber 73 to introduce a fault into cryptosystem 71; FIG. 7 illustrates an integrated circuit 80 of a cryptosystem 81 being bombarded with radio frequency energy 82 supplied from a radio frequency source 83 to introduce a fault into cryptosystem 81; FIG. 8 illustrates an integrated circuit 90 of a cryptosystem 91 being bombarded with ions 92 from a heavy ion source 93 to introduce a fault into cryptosystem 91; and FIG. 9 illustrates an integrated circuit 100 of a cryptosystem 101 being bombarded with light 102, such as ultra-violet light or laser light, from a light source 103 to introduce a fault into cryptosystem 101. The foregoing list of methods of introducing a fault into a cryptosystem is not intended to be exclusive of other unforeseen threat models. Furthermore, the fault may be introduced into one or more registers of the cryptographic hardware of the cryptosystem such as an integrated circuit or semiconductor die, and may further take the form of a one-bit fault.

Figure 10:
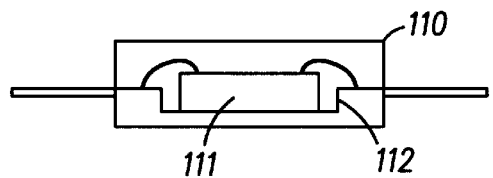
FIG. 10 illustrates a shield mounted to encompass an integrated circuit of a cryptosystem to immunize the integrated circuit from a fault analysis attack.
Figure 11:
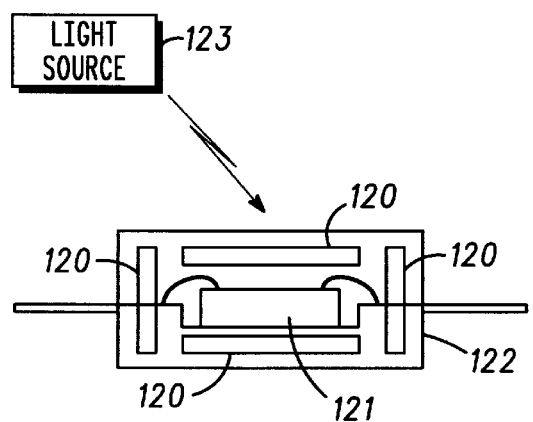
FIG. 11 illustrates a plurality of opaque shields mounted adjacent an integrated circuit of a cryptosystem to immunize the integrated circuit from a fault analysis attack initiated by a light source.
Figure 12:
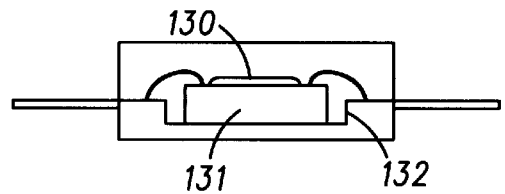
FIG. 12 illustrates a shielding coating mounted upon an integrated circuit of a cryptosystem to immunize the integrated circuit from a fault analysis attack.
Figure 13:
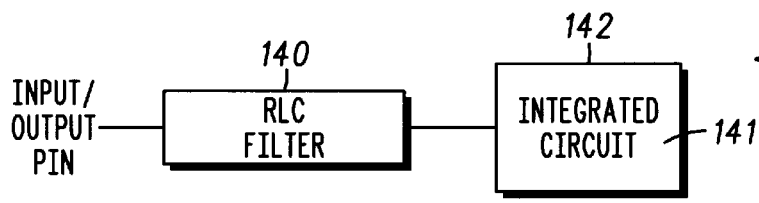
FIG. 13 illustrates an RLC filter coupled to an integrated circuit of a cryptosystem to immunize the integrated circuit from a fault analysis attack.
Figure 14:
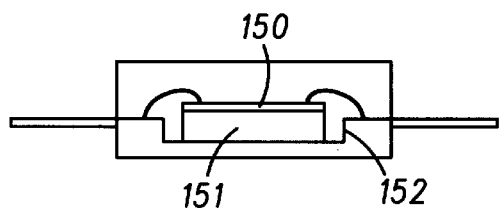
FIG. 14 illustrates a LT gallium arsenide layer mounted upon an integrated circuit of a cryptosystem to immunize the integrated circuit from a fault analysis attack.
Figure 15:
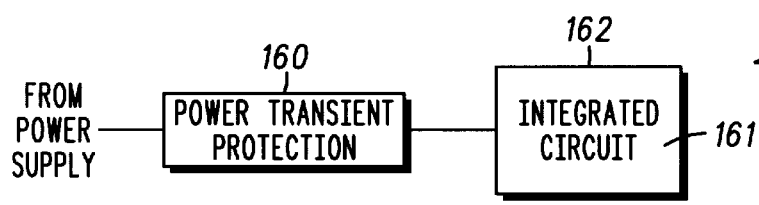
FIG. 15 illustrates a power transient detector coupled to an integrated circuit of a cryptosystem to immunize the integrated circuit from a fault analysis attack.
Figure 16:
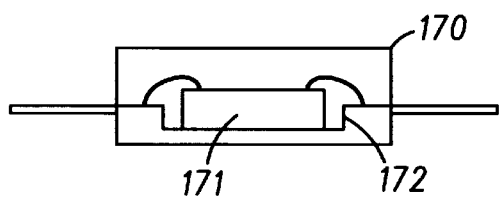
FIG. 16 illustrates a power transient protector mounted upon an integrated circuit of a cryptosystem to immunize the integrated circuit from a fault analysis attack.
Figure 17:
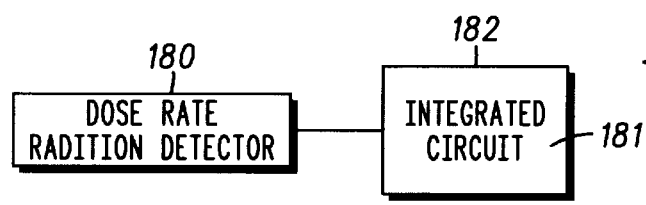
FIG. 17 illustrates a dose rate radiation detector coupled to an integrated circuit of a cryptosystem to immunize the integrated circuit from a fault analysis attack.
Figure 18:
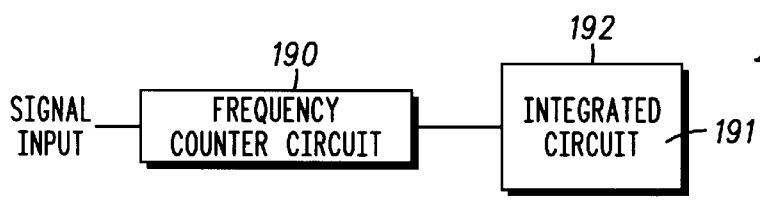
FIG. 18 illustrates a frequency counter circuit coupled to an integrated circuit of a cryptosystem to immunize the integrated circuit from a fault analysis attack.
Figure 19:
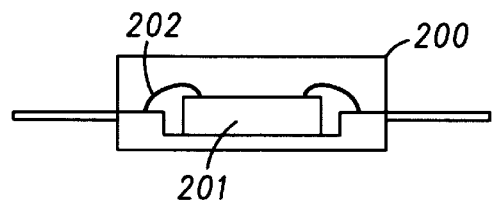
FIG. 19 illustrates internal light detectors mounted within an integrated circuit of a cryptosystem to immunize the integrated circuit from a fault analysis attack.
Figure 20:
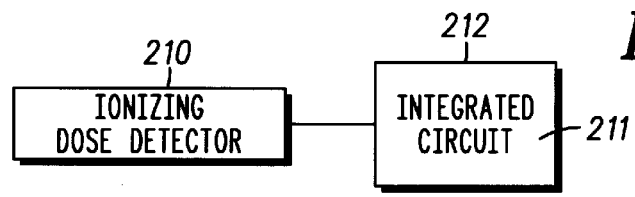
FIG. 20 illustrates an ionizing dose detector coupled to an integrated circuit of a cryptosystem to immunize the integrated circuit from a fault analysis attack.
Figure 21:
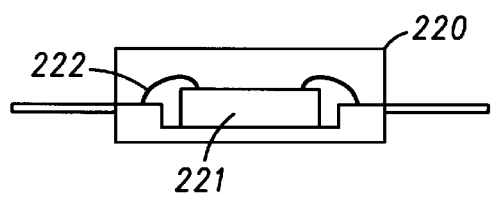
FIG. 21 illustrates an internal temperature sensor mounted within an integrated circuit of a cryptosystem to immunize the integrated circuit from a fault analysis attack.
Figure 22:
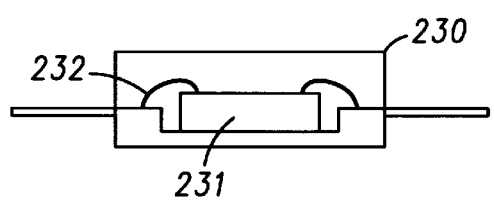
FIG. 22 illustrates an internal pressure sensor mounted within an integrated circuit of a cryptosystem to immunize the integrated circuit from a fault analysis attack.
Figure 23:
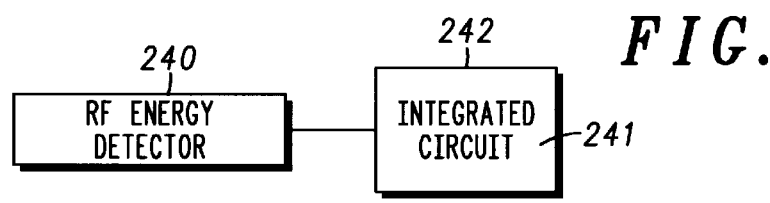
FIG. 23 illustrates a radio frequency detector coupled to an integrated circuit of a cryptosystem to immunize the integrated circuit from a fault analysis attack.

If the fault analysis is unsuccessful and the cryptosystem cannot be compromised after completion of task 22, the foregoing method ends in task 24. However, if the fault analysis is successful and the cryptosystem can be compromised after completion of task 22, the present method further includes the step of improving or hardening 26 portions of the cryptographic hardware of the cryptosystem vulnerable or otherwise susceptible to successful fault analy-sis attack to allow the cryptosystem to resist fault analysis attack. Improving or hardening the cryptosystem in task 26 may be carried out in a variety of ways depending upon the nature of the stress applied to the cryptosystem causing the fault. By way of example of how a cryptosystem may be improved, FIG. 10 illustrates a shield 110 constructed of metal or other substance mounted to encompass or otherwise package an integrated circuit 111 of a cryptosystem 112 to immunize integrated circuit 111 from a fault analysis attack such as through light bombardment; FIG. 11 illustrates a plurality of opaque shields 120 mounted adjacent an integrated circuit 121 of a cryptosystem 122 to immunize integrated circuit 121 from a fault analysis attack initiated by, for instance, a light source 123; FIG. 12 illustrates a shielding coating 130 mounted upon an integrated circuit 131 of a cryptosystem 132 to immunize integrated circuit 131 from a fault analysis attack initiated by, for instance, a light source; FIG. 13 illustrates an RLC filter 140 coupled to an integrated circuit 141 of a cryptosystem 142 to immunize integrated circuit 141 from a fault analysis attack; FIG. 14 illustrates a LT gallium arsenide layer or coating 150 mounted upon an integrated circuit 151 of a cryptosystem 152 to immunize integrated circuit 151 from a fault analysis attack; FIG. 15 illustrates a power transient detector 160 coupled to an integrated circuit 161 of a cryptosystem 162 to immunize integrated circuit 161 from a fault analysis attack by providing over/under voltage protection for integrated circuit 161; FIG. 16 illustrates a power transient protector 170 mounted upon an integrated circuit 171 of a cryptosystem 172 to immunize integrated circuit 171 from a fault analysis attack by providing over/under voltage protection for integrated circuit 171; FIG. 17 illustrates a dose rate radiation detector 180 coupled to an integrated circuit 181 of a cryptosystem 182 to immunize integrated circuit 181 from a fault analysis attack initiated by radiation bombardment; FIG. 18 illustrates a frequency counter circuit 190 coupled to an integrated circuit 191 of a cryptosystem 192 to immunize integrated circuit 191 from a fault analysis attack by detecting frequencies above that expected for circuit operation; FIG. 19 illustrates internal light detectors 200 mounted within an integrated circuit 201 of a cryptosystem 202 to immunize integrated circuit 201 from a fault analysis attack initiated by light bombardment; FIG. 20 illustrates an ionizing dose detector 210 coupled to an integrated circuit 211 of a cryptosystem 212 to immunize integrated circuit 211 from a fault analysis attack by ion bombardment; FIG. 21 illustrates an internal temperature sensor 220 mounted within an integrated circuit 221 of a cryptosystem 222 to immunize integrated circuit 221 from a fault analysis attack initiated by temperature changes; FIG. 22 illustrates an internal pressure sensor 230 mounted within an integrated circuit 231 of a cryptosystem 232 to immunize integrated circuit 231 from a fault analysis attack initiated by pressure changes; and FIG. 23 illustrates a radio frequency detector 240 coupled to an integrated circuit 241 of a cryptosystem 242 to immunize integrated circuit 241 from a fault analysis attack initiated by radio frequency energy bombardment.

After improving the cryptosystem in task 26, tasks 16–22 may be repeated to again determined whether the improved cryptosystem can be subject to successful fault analysis attack. If the fault analysis is unsuccessful and the cryptosystem cannot be compromised after completion of task 22, the foregoing method ends in task 24. However, if the fault analysis is still successful and the cryptosystem can be compromised after completion of task 22, tasks 26 and 16–22 may be repeated. In this regard, tasks 26 and 16–22 may be sequentially repeated until after task 22, the fault analysis attack is unsuccessful and the cryptosystem improved sufficiently to withstand successful fault analysis attack. However, succeeding faults introduced in task 16 after completion of task 26 may preferably be altered somewhat in order to not only verify whether the improvements made to the cryptosystem were sufficient to immunize the previously vulnerable areas of the cryptosystem from becoming compromised through fault introduction, but also to search for additional vulnerable areas or other areas otherwise susceptible to becoming compromised by virtue of fault analysis. For instance, if the original fault introduced in task 16 prior to the first initiation of task 26 was a fault introduced through bombarding an integrated circuit with light, the wavelength and intensity of the light may be altered somewhat prior to introducing a succeeding fault analysis attack in task 16. Thus, varying the nature of the fault introduced in task 18 is a preferred manner of not only verifying improved portions of the cryptosystem, but also of searching for other susceptible areas of the cryptosystem.

In summary, the present invention provides a method of determining whether a cryptosystem is vulnerable to fault analysis attack and of improving vulnerable areas of the cryptosystem until it is immune to successful fault analysis attack. The present method is easy to implement, inexpensive, and proves exemplary for not only using fault introduction as a measure of determining weaknesses in cryptographic hardware, but also improving the weaknesses in the cryptographic hardware found through fault introduction to immunizing the cryptographic hardware of cryptosystems from successful fault analysis attack.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A method of improving a cryptosystem to reduce faults comprising the steps of:

encrypting plaintext into ciphertext with a cryptokey;

bombarding an integrated circuit of the cryptosystem with light from light sources to introduce a fault into the encrypting process to generate a ciphertext with faults, the light sources including an ultraviolet light source, a laser light source and a visible light source;

introducing a power transient into the integrated circuit using a power transient generator to introduce the fault in the ciphertext and varying amplitude, frequency and phase of the power transient;

introducing a clock transient into the integrated circuit with a clock transient generator to introduce the fault in the ciphertext and varying amplitude, frequency and phase of the clock transient;

exposing the integrated circuit to temperature changes using a thermal chamber to introduce the fault in the ciphertext;

exposing the integrated circuit to pressure changes using a pressure chamber to introduce the fault in the ciphertext;

bombarding the integrated circuit with RF energy from an RF energy source to introduce the fault in the ciphertext and varying amplitude, phase and frequency of the RF energy;

bombarding the integrated circuit with ions from a heavy ion source to introduce the fault in the ciphertext;

exposing the integrated circuit to radiation to introduce the fault in the ciphertext;

shielding the integrated circuit with a shield encompassing the integrated circuit when one of the light sources introduces the fault;

coupling the integrated circuit to a power transient protector when the power transient introduces the fault;

coupling an RLC filter to the integrated circuit when the clock transient causes the fault;

coupling a dose rate radiation detector to the cryptosystem when the radiation causes the fault;

coupling a frequency counter to the cryptosystem when the RF energy having a frequency above an operation frequency for the integrated circuit causes the fault;

mounting internal light detectors within the cryptosystem when one of the light sources causes the fault;

coupling an ionizing dose detector to the cryptosystem when the ion bombardment causes the fault;

mounting an internal temperature sensor within the cryptosystem when temperature changes cause the fault;

mounting an internal pressure sensor within the cryptosystem when the pressure causes the fault;

coupling an RF energy level detector to the cryptosystem when the RF energy above a level causes the fault; and coating the integrated circuit with a LT gallium arsenide layer when the radiation causes the fault, wherein when coupled to the cryptosystem, one or more of the group including the dose rate radiation detector, the frequency counter, the internal light detectors, the ionizing dose detector, the internal temperature sensor, the internal pressure sensor or the RF energy detector cause the cryptokey to be zeroed.

2. A method of evaluating a cryptosystem to determine whether the cryptosystem can withstand a fault analysis attack and of immunizing the cryptosystem to resist a fault analysis attack, the method comprising the steps of:

(a) providing a cryptosystem having an encrypting process to encrypt a plaintext into a ciphertext with a cryptokey;

(b) introducing a fault into the encrypting process to generate a ciphertext with faults;

(c) comparing the ciphertext with the ciphertext with faults in an attempt to recover a key of the cryptosystem;

(d) if the key of the cryptosystem is recovered after comparing the ciphertext with the ciphertext with faults, hardening the cryptosystem to resist successful fault analysis; and (e) repeating steps (b)–(d) until the key of the cryptosystem is not recovered after comparing the ciphertext with the ciphertext with faults, wherein the introducing a fault step comprises the steps of:

bombarding an integrated circuit of the cryptosystem with light from light sources, the light sources including an ultraviolet light source, a laser light source and a visible light source;

introducing a power transient into the integrated circuit using a power transient generator and varying amplitude, frequency and phase of the power transient;

introducing a clock transient into the integrated circuit with a clock transient generator and varying amplitude, frequency and phase of the clock transient;

exposing the integrated circuit to temperature changes using a thermal chamber;

exposing the integrated circuit to pressure changes using a pressure chamber;

bombarding the integrated circuit with RF energy from an RF energy source and varying amplitude, phase and frequency of the RF energy;

bombarding the integrated circuit with ions from a heavy ion source; and exposing the integrated circuit to radiation, and wherein the hardening step comprises the steps of:
    shielding the integrated circuit with a shield encompassing the integrated circuit when one of the light sources introduces the fault;
    coupling the integrated circuit to a power transient protector when the power transient introduces the fault;
    coupling an RLC filter to the integrated circuit when the clock transient causes the fault;
    coupling a dose rate radiation detector to the cryptosystem when the radiation causes the fault;
    coupling a frequency counter to the cryptosystem when the RF energy having a frequency above an operation frequency for the integrated circuit causes the fault;
    mounting internal light detectors within the cryptosystem when one of the light sources causes the fault;
    coupling an ionizing dose detector to the cryptosystem when the ion bombardment causes the fault;
    mounting an internal temperature sensor within the cryptosystem when temperature changes cause the fault;
    mounting an internal pressure sensor within the cryptosystem when the pressure causes the fault;
    coupling an RF energy level detector to the cryptosystem when the RF energy above a level causes the fault; and
    coating the integrated circuit with a LT gallium arsenide layer when the radiation causes the fault, wherein when coupled to the cryptosystem one or more of the group including the dose rate radiation detector, the frequency counter, the internal light detectors, the ionizing dose detector, the internal temperature sensor, the internal pressure sensor or the RF energy detector cause the cryptokey to be zeroed.

\* \* \* \* \*